United States Patent [19]
Plevka

[11] Patent Number: 5,687,979
[45] Date of Patent: Nov. 18, 1997

[54] STORAGE ATTACHMENTS FOR WHEELBARROWS

[76] Inventor: Dean A. Plevka, 332 Mill Pond Rd., Lake Wylie, S.C. 29710

[21] Appl. No.: 552,707

[22] Filed: Nov. 3, 1995

[51] Int. Cl.⁶ .................................................. B62B 1/18
[52] U.S. Cl. ......................... 280/47.19; 280/47.31; 280/47.32
[58] Field of Search ..................... 280/47.31, 47.32, 280/78, 47.3, 47.19, 47.18, 79.3

[56] References Cited

U.S. PATENT DOCUMENTS

| | | |
|---|---|---|
| 1,108,642 | 8/1914 | Travis ................ 280/47.31 |
| 1,382,566 | 6/1921 | Strauch . |
| 1,711,730 | 5/1929 | Gibson . |
| 2,621,799 | 12/1952 | Wilson ................ 280/47.19 |
| 4,758,010 | 7/1988 | Christie ................ 280/47.31 |
| 5,242,177 | 9/1993 | Morris ................ 280/47.31 |
| 5,415,421 | 5/1995 | Godwin ................ 280/47.31 |

FOREIGN PATENT DOCUMENTS

| | | |
|---|---|---|
| 21481 | 10/1946 | Finland . |
| 0749393 | 7/1933 | France ................ 280/47.31 |
| 1157626 | 6/1958 | France ................ 280/47.32 |
| 694064 | 7/1953 | United Kingdom . |

*Primary Examiner*—Anne Marie Boehler
*Attorney, Agent, or Firm*—Bell, Seltzer, Park & Gibson, P.A.

[57] ABSTRACT

Wheelbarrow attachments for releasably supporting tools having rod-like handles, such as rakes, shovels, and the like, and for storing small hand tools and the like, are provided. One attachment comprises at least one generally L-shaped bracket having first and second legs. The first leg of each bracket is configured to be mounted to the wheelbarrow frame beneath the tray, and the second leg is configured to extend upwardly along one side of the wheelbarrow tray. A gripping clip for releasably supporting a rod-like handle of a tool is secured to the second leg of each generally L-shaped bracket. Another attachment comprises a box-like enclosure mounted below the tray of the wheelbarrow and having an opening in the end thereof facing the rearward end of the wheelbarrow, for receiving small hand tools therein.

10 Claims, 1 Drawing Sheet

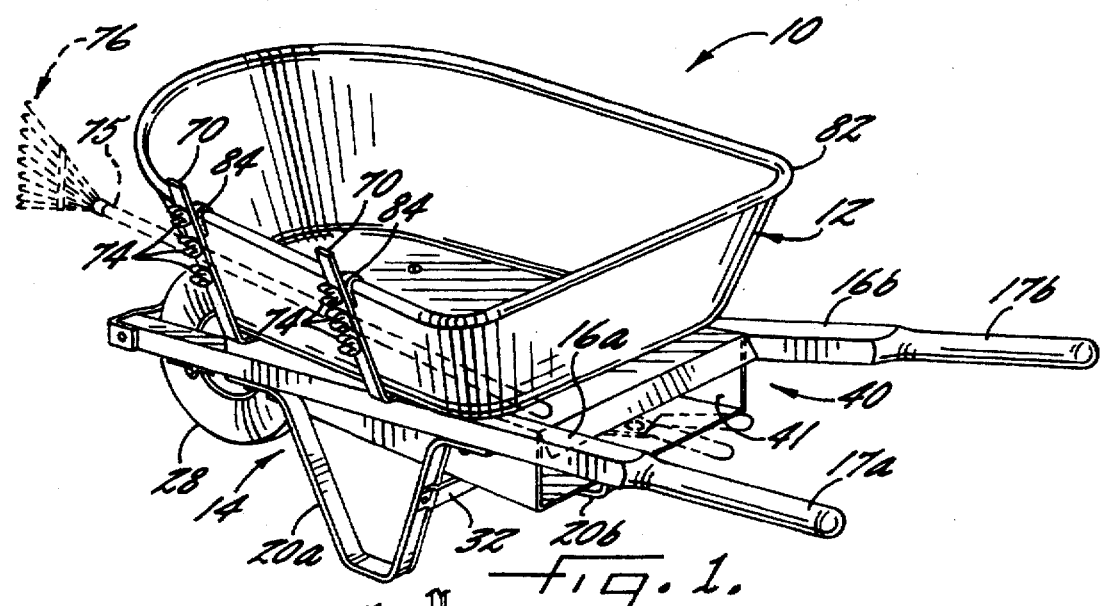
Fig. 1.
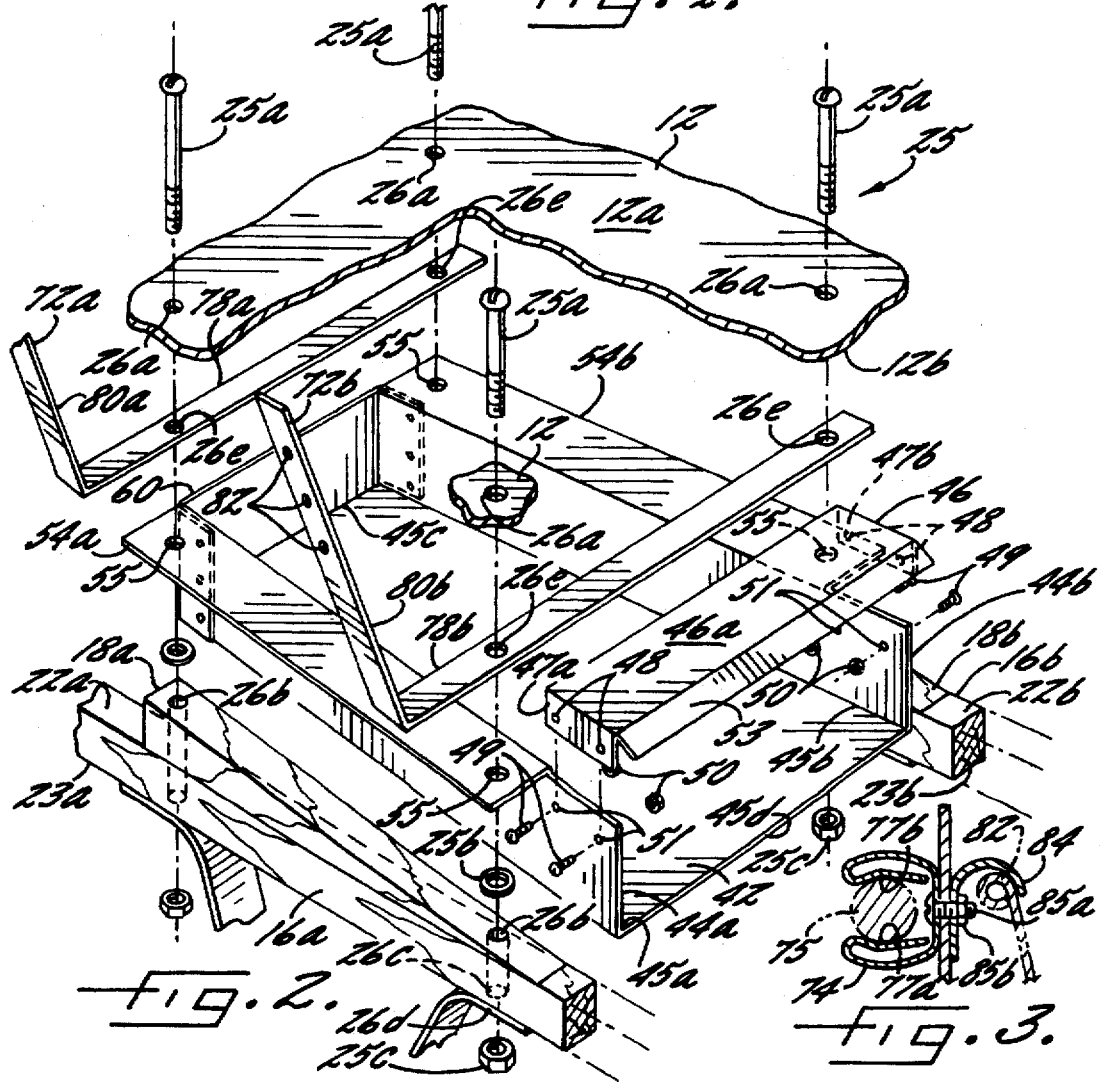
Fig. 2.
Fig. 3.

STORAGE ATTACHMENTS FOR WHEELBARROWS

FIELD OF THE INVENTION

The present invention relates generally to wheelbarrows and more particularly to wheelbarrow attachments.

BACKGROUND OF THE INVENTION

A conventional wheelbarrow typically is well suited for hauling materials that are fully contained within its tray, such as dirt, sand, gravel and the like. A conventional wheelbarrow, however, is not particularly well suited for transporting elongate objects such as rakes, shovels, and the like. A shovel, for example, is typically either carried by the person pushing the wheelbarrow, or carried by laying it on or within the tray. Unfortunately, it is cumbersome and difficult for a person to manipulate a ladened wheelbarrow and carry other objects at the same time. It is also difficult and cumbersome for a person to manipulate a ladened wheelbarrow having tools such as rakes and shovels in the tray and prevent them from moving around or falling out. It is also undesirable to carry hand tools and the like in the tray of a wheelbarrow ladened with materials such as dirt and sand.

SUMMARY OF THE INVENTION

It is, therefore, an object of the present invention to provide a wheelbarrow attachment for carrying shovels, rakes, and the like.

It is also an object of the present invention to provide a wheelbarrow attachment that facilitates carrying hand tools and the like without placing them within the tray.

These and other objects are provided, according to one aspect of the present invention, by a wheelbarrow attachment for releasably supporting slender objects such as rakes, shovels, and the like. The attachment comprises at least one generally L-shaped bracket having first and second legs. The first leg of each bracket is configured to be mounted to a wheelbarrow frame and the second leg of each bracket is configured to be mounted to one side of a wheelbarrow tray. A gripping mechanism for releasably supporting a slender object is secured to the second leg of each generally L-shaped bracket. The gripping mechanism may comprise at least one spring clip having a pair of opposingly biased jaws. The attachment components may be formed of plastic or metal.

According to another aspect of the present invention, a wheelbarrow attachment for receiving small hand tools and the like beneath a wheelbarrow tray is provided. The attachment comprises a bottom panel, opposing first and second side panels, and an end panel. The bottom panel has opposing first and second edges and opposing third and fourth edges. The first and second side panels extend from the bottom panel adjacent respective first and second bottom panel edges. The first and second side panels each have a portion configured to be secured to the bottom surface of a wheelbarrow tray. The end panel extends from the bottom panel adjacent the bottom panel third edge and extends between the first and second side panels. The wheelbarrow attachment may also comprise a top panel in generally opposing parallel relation to the bottom panel and extending between the first and second side panels. The top panel also includes a shield to reduce the ingress of foreign material. The attachment may be configured to fit beneath virtually any wheelbarrow design. Typically, the attachment will have a generally trapezoidal shape to fit between the converging frame members of a single-wheeled wheelbarrow. The attachment components may be formed of plastic or metal.

The attachments, according to the present invention, are designed to utilize the existing mounting hardware of a wheelbarrow. Consequently, each attachment may be purchased separately and installed easily on an existing wheelbarrow, or a wheelbarrow may be purchased with either or both of the attachments already assembled thereto.

According to another aspect of the present invention a wheelbarrow having provision for transporting a loose material such as dirt and sand, and also having provision for carrying a variety of tools in a readily accessible location is provided. The wheelbarrow comprises a frame, a wheel, a tray, a pair of L-shaped brackets, and a gripping device secured to each one of the brackets for releasably supporting a rod-like handle of a tool therebetween.

The frame includes a pair of generally parallel and longitudinally directed posts which define forward and rearward ends of the frame. The wheel is mounted to the forward end of the frame so that the wheelbarrow may be rolled along the ground in the longitudinal direction by a user gripping and lifting the rearward ends of the posts. The tray is mounted upon the posts of the frame for supporting a loose material therein. A pair of L-shaped brackets include first and second legs. The first leg of each bracket is mounted between the posts and the tray so that the brackets extend in a direction transverse to the longitudinal direction of the posts. Each of the brackets may have a clip fixed to the second leg for engaging an upper edge of the tray. The brackets are longitudinally spaced apart from each other and extend generally upwardly along one side of the tray. Each bracket has at least one gripping device secured to the second leg for releasably supporting a rod-like handle of a tool therebetween. The wheelbarrow may further comprise a box-like enclosure mounted below the tray and between the posts for receiving small hand tools and the like therein.

According to another aspect of the present invention a wheelbarrow having provision for transporting a loose material such as dirt and sand, and also having provision for carrying a variety of tools in a readily accessible location is provided. The wheelbarrow comprises a frame, a wheel, a tray, and a box-like enclosure mounted below the tray. The frame includes a pair of generally parallel and longitudinally directed posts which define forward and rearward ends of the frame. The wheel is mounted to the forward end of the frame so that the wheelbarrow may be rolled along the ground in the longitudinal direction by a user gripping and lifting the rearward ends of the posts. The tray is mounted upon the posts of the frame for supporting a loose material therein. The box-like enclosure is mounted below the tray and between the posts. The enclosure has an opening in the end thereof facing the rearward end of the frame for receiving small hand tools and the like therein.

BRIEF DESCRIPTION OF THE DRAWINGS

FIG. 1 is a perspective view of a wheelbarrow fitted with attachments for carrying shovels, rakes, hand tools, and the like according to the present invention.

FIG. 2 is an exploded view of the wheelbarrow attachments illustrated in FIG. 1.

FIG. 3 is a section view of a wheelbarrow attachment for releasably supporting slender objects.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout.

Referring now to FIG. 1, a conventional wheelbarrow fitted with attachments for carrying shovels, rakes, hand tools, and the like, according to the present invention, is illustrated. It is to be understood, however, that the present invention is not limited to the illustrated wheelbarrow design. The illustrated wheelbarrow 10 comprises a tray 12, a frame 14, and a wheel 28. The frame 14 comprises first and second frame side posts 16a,16b, first and second risers 18a,18b, and first and second legs 20a,20b. The first and second frame side posts 16a,16b are generally elongated wooden posts having a square or rectangular cross-section. Each one of the illustrated frame side posts 16a,16b includes a rounded handle portion 17a,17b to facilitate lifting and pushing the wheelbarrow 10. The first and second risers 18a,18b are generally wedge-shaped and are mounted on the upper surfaces 22a,22b of frame side posts 16a,16b, respectively. The tray 12 is mounted on the risers 18a, 18b and the first and second legs 20a,20b are mounted on the lower surfaces 23a,23b of the first and second frame side posts 16a,16b, respectively.

For a wheelbarrow not fitted with the attachments 40,70 (described in detail below) according to the present invention, the tray 12, first and second risers 18a,18b, first and second frame side posts 16a,16b, and first and second legs 20a,20b are secured together via mounting hardware 25. The mounting hardware comprises a plurality of bolts 25a, washers 25b, and nuts 25c. Each bolt 25a is inserted through a series of aligned holes 26a,26b,26c,26d in the tray 12, the first and second risers 18a,18b, the first and second frame side posts 16a,16b, and the first and second legs 20a,20b, respectively, and secured via a washer 25b and nut 25c. The wheel 28 is rotatably secured between the first and second frame side posts 16a,16b near the front of the wheelbarrow. In the illustrated embodiment, the attachments 40,70 are secured between the tray 12, and the first and second risers 18a,18b.

Referring now to FIG. 2, a first attachment 40, for storing hand tools and the like beneath a wheelbarrow tray 12, according to the present invention, comprises a bottom panel 42, opposing first and second side panels 44a,44b, and an end panel 60. When secured to the bottom surface 12b of a wheelbarrow tray 12, the bottom panel 42, side panels 44a,44b, and end panel 60 define a box-like enclosure having an opening 41 for receiving hand tools and the like therein. In the illustrated embodiment, the attachment 40 has a somewhat trapezoidal shape in order to conform generally with the configuration of the frame side posts 16a,16b, which converge towards the wheel 28. However, the attachment 40 is not limited to this shape and may have various shapes depending on the design and shape of a particular wheelbarrow. An object of the present invention is to provide an enclosure that fits beneath the tray and between the frame side posts of any particular wheelbarrow. Each of the components comprising the first attachment 40 may be formed from a variety of materials, including but not limited to plastic and metal.

In the illustrated embodiment, the bottom panel 42 has opposing first and second edges 45a,45b and opposing third and fourth edges 45c,45d. The first and second side panels 44a,44b extend from the bottom panel 42 adjacent the first and second edges 45a,45b, respectively. The first and second side panels 44a,44b are generally rectangular in shape and converge towards the end panel 60. The end panel 60 is generally rectangular in shape and extends from the bottom panel 42 adjacent the third edge 45c and between the first and second side panels 44a,44b. However, the first and second side panels 44a,44b and the end panel 60 can have any shape desirable and are not limited to being generally rectangular. The end panel 60 is not limited to being generally perpendicular with respect to the bottom panel 42, as illustrated. The end panel 60 may extend from the bottom panel 42 at any angle desirable. Similarly, the first and second side panels 44a,44b are not limited to being generally perpendicular to the bottom panel 42, as illustrated. The first and second side panels 44a,44b may extend from the bottom panel 42 at any angle desirable.

Preferably, a top panel 46 is removably secured to the first and second side panels 44a,44b near their diverging ends. In the illustrated embodiment, the top panel 46 is secured to each side panel via bolts 49 inserted through holes 48 in the first and second tabs 47a,47b depending from the top panel, and respective holes 51 in each side panel 44a,44b. Each bolt 49 is secured by a nut 50. As would be understood by those having skill in the art, the top panel may be secured to the first and second side panels 44a,44b in a variety of ways. Although the top panel 46 is illustrated as being removable, it may be permanently attached. Acceptable permanent methods of attachment include riveting, soldering and the like.

Preferably, the top panel 46 includes a shield 53 extending therefrom to protect against the ingress of rain and other foreign material into the attachment 40. In the illustrated embodiment, the shield 53 extends downwardly at about a 45° angle with respect to the top surface 46a of the top panel 46. However, the angle of the shield 53 is not critical; it may be positioned at any desirable angle.

Still referring to FIG. 2, the first and second side panels 44a,44b include respective flange portions 54a,54b extending therefrom and configured to mount the assembled attachment 40 to the bottom surface 12b of a wheelbarrow tray 12. In the illustrated embodiment, each flange portion 54a,54b is generally perpendicular to its respective side panel 44a, 44b. However, because the first and second side panels 44a,44b are not limited to being generally perpendicular with respect to the bottom panel 42, as illustrated, each flange portion 54a,54b may or may not be perpendicular with respect to its respective side panel 44a,44b.

Preferably, each flange portion 54a,54b includes holes 55 therethrough which are configured to align with the holes 26a,26b, 26c, 26d in the wheelbarrow tray 12, the first and second risers, the first and second frame side posts 16a,16b, and the first and second legs 20a,20b, respectfully. Preferably, bolts 25a and respective washers 25b and nuts 25c secure the attachment 40 between the tray 12 and the frame 14, as illustrated. The present invention is advantageous because the first attachment 40 utilizes the existing mounting arrangement used to secure the tray, frame and legs of a wheelbarrow. As a result, a wheelbarrow may be purchased with an assembled attachment 40, or an attachment may be purchased separately and easily added to a wheelbarrow, thereafter.

According to another embodiment of the present invention, a second attachment 70 facilitates carrying elongated objects such as rakes, shovels, and the like, as shown in FIG. 2. In the illustrated embodiment, the second attachment 70 comprises a pair of spaced apart brackets 72a,72b, each one having a plurality of spring clips 74 for releasably supporting a slender object such as the handle 75 of a tool 76 (FIG. 1). Preferably, each bracket 72a,72b has a corresponding spring clip 74 such that a tool handle, when carried according to the present invention, is releasably supported by two spring clips, one on each bracket. However, as would be understood by those having skill in the art, a configuration comprising a single bracket and spring clip may be adequate to support a tool handle. Additionally, a configuration comprising more than two brackets with spring clips may be utilized.

In the illustrated embodiment, each bracket 72a,72b has an approximate L-shape defined by a first leg 78a,78b, and a second leg 80a,80b, respectively. The first leg 78a,78b of each bracket 72a,72b is configured to be secured between the bottom surface of a wheelbarrow tray 12 and its frame 14. In the illustrated embodiment, the first leg 78a,78b of each respective bracket 72a,72b is sandwiched between the bottom surface 12b of the tray 12 and the flange portions 54a,54b of the first attachment 40. However, the second attachment 70 may be utilized without the first attachment 40. Consequently, the first leg of each bracket 72a,72b may be sandwiched between the bottom surface 12b of the tray 12 and the first and second risers 18a,18b. Preferably, the second leg 80a,80b of each bracket 72a,72b is configured to be secured to an edge 82 of a wheelbarrow tray 12. However, other methods of attachment to the tray 12 may be acceptable. As shown in FIG. 3, a hook or clip 84 is configured to overlie the edge 82 of a wheelbarrow tray 12. The clip 84 is secured to each second leg 80a,80b via a bolt 85a and nut 85b. However, the clip 84 may be secured to each bracket 72a,72b via a variety of methods known to those having skill in the art.

In the illustrated embodiment, each second leg 80a,80b has a plurality of holes 82 therethrough to facilitate securing a respective plurality of spring clips 74 via respective bolts 85a and nuts 85b. However, the spring clips 74 may be secured to each bracket 72a,72b via a variety of methods known to those having skill in the art. Preferable spring clips 74 include those disclosed in U.S. Pat. No. 1,711,730 to Gibson, which is incorporated herein by reference in its entirety. Each spring clip 74 preferably comprises a pair of opposingly biased jaws 77a,77b for releasably supporting slender objects such as the handle of a shovel. However, other gripping devices suitable for releasably supporting elongate objects may be acceptable. Each component of the second attachment 70, according to the present invention, may be formed from a variety of materials, including but not limited to plastic and metal.

The present invention is advantageous because the second attachment 70 utilizes the existing mounting arrangement used to secure the tray, frame and legs of a wheelbarrow. As a result, a wheelbarrow may be purchased with an assembled attachment 70, or an attachment may be purchased separately and easily added to a wheelbarrow, thereafter. The first and second wheelbarrow attachments 40,70, according to the present invention, may be used separately or together. Furthermore, the present invention is not limited to the illustrated embodiments; a variety of configurations and orientations of each attachment 40, 70 are possible.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claim:

1. A wheelbarrow having provision for transporting a loose material, and also having provision for carrying a variety of tools in a readily accessible location, and comprising:

a wheelbarrow frame which includes a pair of generally parallel and longitudinally directed posts and which define forward and rearward ends of the frame;

a wheel mounted to the forward end of the frame so that the wheelbarrow may be rolled along the ground in the longitudinal direction by a user gripping and lifting the ends of the posts at the rearward end of the frame;

a tray mounted upon said posts of said frame for supporting a loose material therein;

a pair of L-shaped brackets of like construction, with each of said brackets having first and second legs, and with the first leg of each bracket being mounted between at least one of the posts and the try and so that the brackets extend in a direction transverse to said longitudinal direction and are longitudinally spaced apart from each other, and such that the second legs extend generally upwardly along one side of the tray; and gripping means secured to the second leg of each of the brackets for releasably supporting a handle of a tool therebetween.

2. A wheelbarrow as defined in claim 1 further comprising an enclosure mounted below said tray and between said posts, said enclosure having an opening in the end thereof facing said rearward end of said frame for receiving small hand tools therein.

3. A wheelbarrow as defined in claim 1 wherein each of said L-shaped brackets has a clip fixed to the second leg thereof which engages an upper edge of the tray.

4. A wheelbarrow as defined in claim 1 wherein said gripping means comprises at least one spring clip secured to the second leg of each of the brackets, with each spring clip comprising a pair of opposingly biased jaws.

5. A wheelbarrow as defined in claim 4 wherein each of said L-shaped brackets has a clip fixed to the second leg thereof which engages an upper edge of the tray.

6. A wheelbarrow as defined in claim 1 wherein the first leg of each bracket has a length sufficient to extend between each of the posts and the tray.

7. A wheelbarrow as defined in claim 2 wherein said enclosure comprises:

a bottom panel having opposing first and second edges extending generally parallel to said posts, and opposing third and fourth edges, with the third edge being adjacent said forward end of the frame and said fourth edge being adjacent said rearward end of the frame, opposing first and second side panels extending from said bottom panel respectively along the first and second edges, said first and second sides panels each having a flange portion, with each flange portion being secured between one of said posts and the tray; and an end panel extending from said bottom panel along said third edge and extending between said first and second side panels.

8. A wheelbarrow as defined in claim 7 wherein said enclosure further comprises a top panel disposed in generally parallel and spaced relation above said bottom panel, said top panel extending between the ends of said first and second side panels adjacent said rearward end of the frame.

9. A wheelbarrow as defined in claim 8 wherein said top panel includes a downwardly directed shield along an edge thereof adjacent said opening to reduce the ingress of foreign material into said enclosure.

10. A wheelbarrow according to claim 7 wherein said bottom panel has a generally trapezoidal shape and wherein said side panels coverage towards said end panel.

* * * * *